Patented June 9, 1942

2,286,125

UNITED STATES PATENT OFFICE 2,286,125

CHEMICAL PROCESS

Michael Sveda, Cleveland, Ohio, assignor to E. I. du Pont de Nemours & Company, Wilmington, Del., a corporation of Delaware No Drawing. Application December 19, 1940, Serial No. 370,820

5 Claims. (Cl. 260—601)

This invention relates to glyoxal and more particularly to processes for producing monomeric glyoxal in which glyoxal sulfate is triturated in aqueous solution with a slightly soluble carbonate of a metal having an insoluble sulfate.

It is an object of this invention to provide processes whereby glyoxal may be produced in monomeric form. Another object is to provide processes whereby monomeric glyoxal is produced from the relatively inexpensive raw material, glyoxal sulfate. Another object is to provide processes whereby monomeric glyoxal is produced from glyoxal sulfate in a single-step synthesis. Other objects of the invention will appear hereinafter.

The foregoing and related objects are accomplished according to this invention by processes in which glyoxal sulfate is triturated in aqueous solution with a slightly soluble carbonate of a metal having an insoluble sulfate. By the processes of this invention, monomeric glyoxal is directly produced from relatively inexpensive raw materials and with a minimum of the polymerization difficulties which have heretofore attended the production of glyoxal.

The nature of this invention and the manner of employing it will be made clearer by reference to an illustrative example, but it will be understood that this example is given by way of explanation and not of limitation.

Example

A mixture of 4.4 parts by weight of glyoxal sulfate and 7.8 parts of barium carbonate was triturated with 10 parts of water for two hours. The trituration was accomplished in a ball mill. A pasty mass was obtained comprising barium sulfate precipitated in an aqueous glyoxal solution. From this mixture the barium sulfate was filtered off and an aqueous solution of glyoxal was obtained.

By adding phenyl hydrazine and acetic acid to a portion of this solution there was obtained a phenyl osozone melting at 180° C., definitely establishing the fact that the glyoxal was in the monomeric state.

The proportions of glyoxal sulfate and metal carbonate used in a process of this invention should be approximately stoichiometrically equivalent quantities, since if an excess of glyoxal sulfate is used the excess will have to be removed from the product and an excess of carbonate, though it will not contaminate the product, will accomplish no useful purpose and will be wasteful of this raw material.

As the carbonate employed, there may be selected any sparingly soluble metal carbonate having an insoluble sulfate. In other words, there should be used a slightly-soluble metal carbonate of a metal which forms a still less soluble sulfate. The carbonates of lead, calcium, strontium, and barium are particularly suitable.

The trituration should be such as to reduce the reactants to a fine powder by grinding or rubbing them. The trituration may be accomplished by means of a ball mill as shown in the foregoing example or by other devices known in the art for this purpose such as mills of the type used for grinding pigments, edge runner mills, and other devices of this general type.

The insoluble metal sulfate formed as a by-product in a process of this invention may be removed from the monomeric glyoxal solution by any suitable method. Instead of the filtration employed for this purpose in the example given above, the precipitate could be removed, for instance, by centrifuging or by settling.

If it is desired to obtain a monomeric glyoxal free of water, the aqueous solution from the trituration step may be dried. It is preferred, however, to effect such a dewatering step in accordance with methods conventionally applied for removing water from substances which are heat-sensitive since heating of the solution causes some polymerization of the glyoxal to take place. Accordingly, it is preferred to use some such technique as by extraction with a solvent such as ether, followed by evaporation of the solvent at relatively low temperatures, if an anhydrous product is desired.

While in the foregoing description of this invention there have been shown certain processes, it will be understood that without departing from the spirit of this invention one may employ numerous processes for producing monomeric glyoxal.

I claim:

1. In a process for producing monomeric glyoxal the step comprising triturating glyoxal sulfate in an aqueous medium with a sparingly soluble carbonate of a metal having an insoluble sulfate.

2. In a process for producing monomeric glyoxal the step comprising triturating glyoxal sulfate in an aqueous medium with a carbonate of a metal selected from the group consisting of barium, calcium, strontium, and lead.

3. In a process for producing monomeric glyoxal the step comprising triturating glyoxal sulfate in an aqueous medium with barium carbonate.

4. In a process for producing monomeric glyoxal the step comprising triturating glyoxal sulfate in an aqueous medium with calcium carbonate.

5. In a process for producing monomeric glyoxal the step comprising triturating glyoxal sulfate in an aqueous medium with strontium carbonate.

MICHAEL SVEDA.